United States Patent

Barkman

[11] 4,221,995
[45] Sep. 9, 1980

[54] LINEAR MOTOR DRIVE SYSTEM FOR CONTINUOUS-PATH CLOSED-LOOP POSITION CONTROL OF AN OBJECT

[75] Inventor: William E. Barkman, Oak Ridge, Tenn.

[73] Assignee: The United States of America as represented by the United States Department of Energy, Washington, D.C.

[21] Appl. No.: 927,442

[22] Filed: Jul. 24, 1978

[51] Int. Cl.³ .............................................. G05B 5/01
[52] U.S. Cl. .................................... 318/616; 318/621; 318/622; 318/640; 318/651
[58] Field of Search ............... 318/640, 615, 616, 621, 318/651, 622, 618

[56] References Cited

U.S. PATENT DOCUMENTS

| | | | |
|---|---|---|---|
| 3,634,682 | 1/1972 | Gold | 318/640 |
| 3,719,879 | 3/1973 | Marcy | 318/640 |
| 3,770,890 | 11/1973 | Winkler | 318/640 |
| 3,789,285 | 1/1974 | Nishizawa | 318/687 |
| 3,851,238 | 11/1974 | Fletcher et al. | 318/640 |
| 3,889,164 | 6/1975 | Nishizawa et al. | 318/640 |
| 3,902,085 | 8/1975 | Bizzigotti | 318/135 |
| 3,917,987 | 11/1975 | Inoue | 318/135 |
| 4,020,374 | 4/1977 | Mailfert et al. | 310/80 |
| 4,049,962 | 9/1977 | Kallen | 318/577 |
| 4,059,788 | 11/1977 | Vasiliev et al. | 318/577 |
| 4,118,776 | 10/1978 | Isomura | 318/569 |
| 4,139,811 | 2/1979 | Klinger | 318/615 |

Primary Examiner—J. V. Truhe
Assistant Examiner—Eugene S. Indyk
Attorney, Agent, or Firm—James E. Denny; Stephen D. Hamel; David E. Breeden

[57] ABSTRACT

A precision numerical controlled servo-positioning system is provided for continuous closed-loop position control of a machine slide or platform driven by a linear-induction motor. The system utilizes filtered velocity feedback to provide system stability required to operate with a system gain of 100 inches/minute/0.001 inch of following error. The filtered velocity feedback signal is derived from the position output signals of a laser interferometer utilized to monitor the movement of the slide. Air-bearing slides mounted to a stable support are utilized to minimize friction and small irregularities in the slideway which would tend to introduce positioning errors. A microprocessor is programmed to read command and feedback information and converts this information into the system following error signal. This error signal is summed with the negative filtered velocity feedback signal at the input of a servo amplifier whose output serves as the drive power signal to the linear motor position control coil.

5 Claims, 3 Drawing Figures

LINEAR MOTOR DRIVE SYSTEM FOR CONTINUOUS-PATH CLOSED-LOOP POSITION CONTROL OF AN OBJECT

BACKGROUND OF THE INVENTION

This invention was made during the course of, or under, a contract with the U.S. Department of Energy.

The subject invention relates generally to positioning systems and more specifically to a servo-controlled, linear motor drive system incorporating a filtered velocity feedback network for continuous path closed-loop position control of an object.

In the art of precision positioning systems to position a machine tool slide, for example, it has generally been the practice to utilize a rotary prime mover coupled to a ball nut/leadscrew. Linear slide motion is obtained by attaching the ball nut to the machine slide and driving the leadscrew through a gear box. The prime mover may take various rotary drive forms, such as, servo motors, pulse motors or pneumatic drives. A numerical controller may be used to generate drive signals for multiple axis coordinated continuous position control of a machine tool from part description data stored on punched tape or other storage means.

Various advances in the art have been used to improve the tool positioning accuracy in the above-described machining system. For example, the laser interferometer has been employed to monitor the slide movement and compared with the position command signals to obtain a following error signal which is used to power the prime mover through a servo amplifier. A velocity feedback arrangement has been combined with the laser interferometer feedback to improve position accuracy. Normally a rotary transducer, such as a tachometer generator, is attached to the leadscrew to generate the velocity control feedback signal.

Nevertheless, prior art continuous path position control systems, of the type above-described, were limited with respect to their prospective utility in many applications, especially diamond machining mirror surface finishes of complex geometric configurations. For continuous path precision machining systems, the above-described systems cannot be controlled to obtain continuous path following errors in the microinch range. In these systems, vibration and positioning uncertainties of the machine slide are introduced by the drive and feedback gearing that affect the accuracy of the machined surface. Thus, there is a need for a continuous path position-control system for precision, continuous contour machining which can be operated at reasonable feed rates (from 0 to 1 inch per minute) with continuous positioning errors for the individual machine slides of less than 1 microinch. In addition, the system should be capable of accepting position commands of 0.33 microinch and holding a commanded position to within 0.63 microinch.

SUMMARY OF THE INVENTION

In view of the above need it is a primary object of this invention to provide a position-control system for precise continuous path position control of an object.

Another object of this invention is to provide a precise continuous path-control system as in the above object wherein a linear drive motor servo system is compensated by means of a filtered velocity feedback signal derived from the position information signals of a laser interferometer disposed to detect changes in the position of the object being positioned.

Other objects and many of the attendant advantages of the present invention will be obvious to those skilled in the art from the following detailed description taken in conjunction with the accompanying drawings.

DETAILED DESCRIPTION

Figure 1:
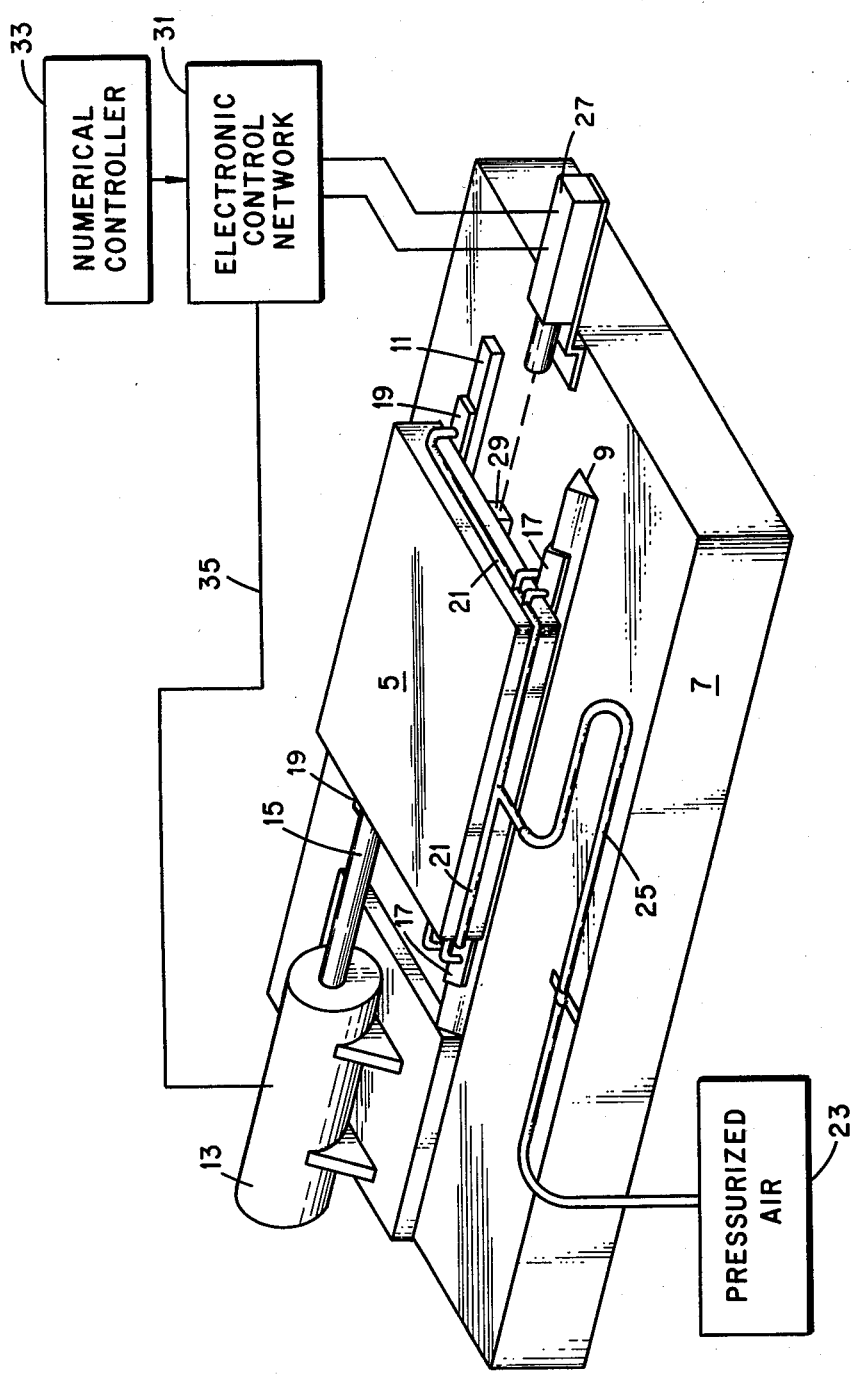
FIG. 1 is a diagrammatic representation of a single axis slide positioning system according to the present invention.

Referring now to FIG. 1, the invention will be illustrated by means of a detailed description of the control system for a single axis slide in order to fully illustrate the invention in the least complicated form. It will be understood by those skilled in the art that a multiple axis machine employing servo drive motors and air-bearing slides may be controlled by duplicating the control arrangement described herein for each axis, as for example in a precision continuous path contour machining system. The slide 5 is mounted on a massive platform or base 7 by means of air-bearing slideways 9 and 11. The base 7 may take various forms and may include conventional vibration isolation mounts (not shown) to prevent building vibrations from being transmitted through the base to the slide 5 which would affect position accuracy. A linear drive motor 13 is secured to the base 7 and includes a shaft 15 which is coupled directly to the slide 5. The shaft 15 may be an integral part of the motor moving member which carries a force control coil wound concentrically about the moving member in a conventional manner. The linear motor includes an exciting coil which generates the DC magnetic field for the stator. The exciting coil is disposed concentrically within the motor housing near the forward end and may be cooled by a circulating water system. The axial force applied to the shaft is a function of the electric current flowing through the control coil. The motor design and operation is conventional, which may be compared to a DC torque motor with the exception of the travel limit imposed by the moving member stroke. The drive motor 5 may be provided in various sizes depending upon the forces required to position various slides or other objects whose positions are to be controlled.

The air-bearing slide is guided by one Vee slideway 9 and one flat slideway 11. The slideways may be bolted to the base 7 and the guide surfaces scraped and honed to obtain a true slide motion. Conventional air-bearing pads 17 and 19 are mounted on the slide 5 to match the slideways 9 and 11 surfaces, respectively. Pressurized air is supplied to the pads through a manifold arrangement 21 connected in fluid communication with a pressurized air source 23 by means of a flexible air hose 25.

The slide position feedback information is provided by means of a laser interferometer system. An interferometer 27 is bolted to the base 7 in alignment with its remote reflector cube 29 attached to the slide 5. Position information is provided to an electronic control network 31 which also receives position command information from a numerical controller 33. The control network 31 generates drive signals, which are applied to the motor 13 control coil via output line 35 to control the slide movement as will be explained hereinbelow.

The system may be used with most any type numerical controller which includes an interpolator for generating command pulses for the desired movement of the slide from data stored in a memory device or manually input to the controller 33. A controller with which a multiple axis control version of the present invention could be used most advantageously is described in a commonly assigned U.S. Pat. No. 3,969,615 entitled "An Interpolator for Numerically Controlled Machine Tools" by Gary L. Bowers, et al. issued July 13, 1976. The referenced system generates command signals for each axis drive as a result of unique data interpolations which need not be explained herein for a clear understanding of the present invention. It is only necessary for a complete understanding of the control system of the present invention that position-command pulses, each representing a specific increment of movement of the slide along its axis and the pulse repetition rate indicative of the velocity at which the slide is to move, are provided on separate lines, or a single line with a separate direction control line, depending upon the direction of commanded movement of the slide.

Figure 2:
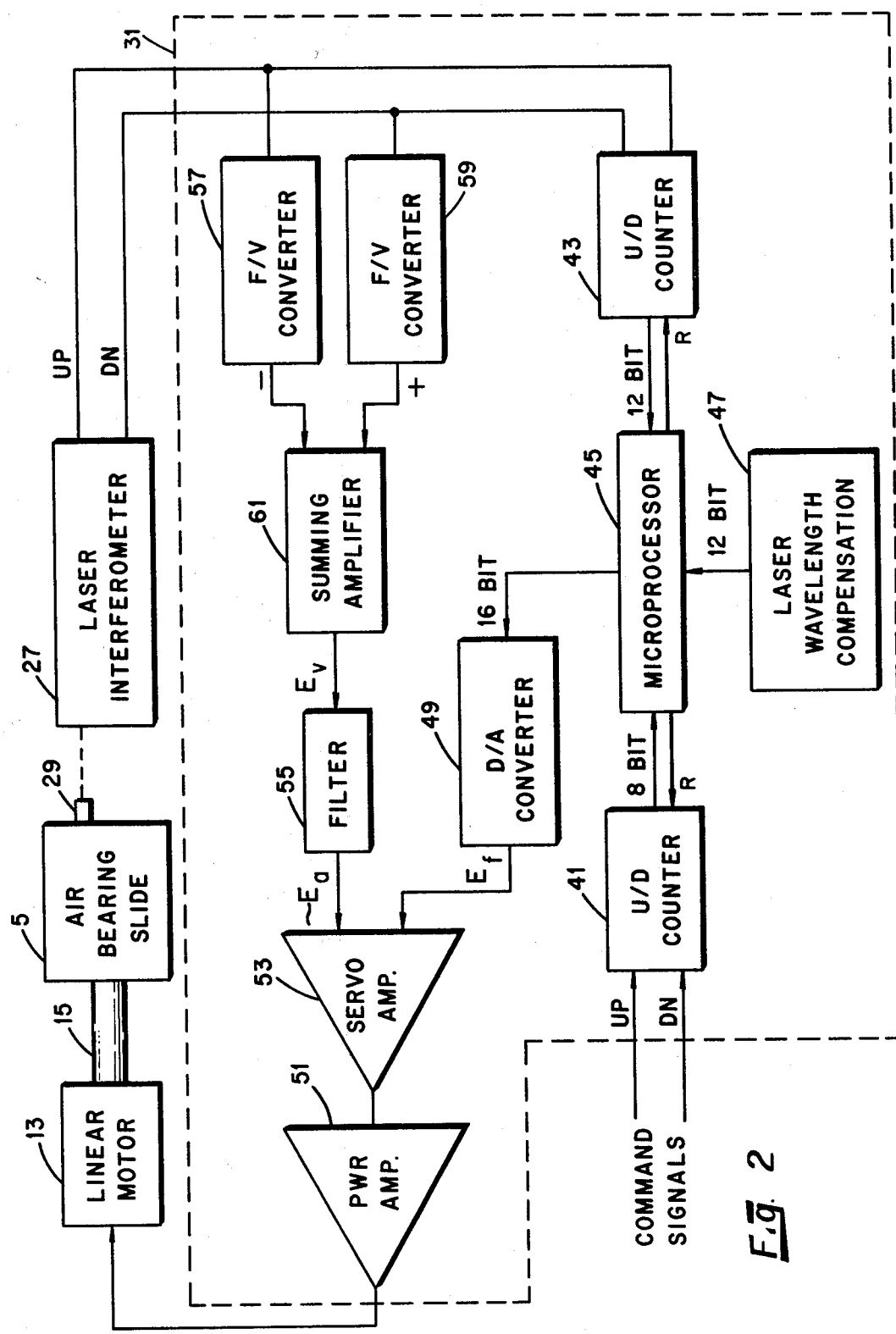
FIG. 2 is a schematic block diagram of a linear motor drive system for continuous path closed-loop position control of a machine slide in accordance with the present invention.

Thus, referring now to FIG. 2, the servo control network 31 (enclosed in dashed lines) will be described. Other parts of the system are shown schematically and identified by like reference numerals corresponding to FIG. 1. The up and down command signal lines from the numerical controller 33 are connected to corresponding inputs of an 8-bit up/down counter 41. Command pulses input on the up line represent forward slide direction movement commands while pulses on the down line indicate reverse slide direction movement commands. Likewise the up/down outputs of the interferometer 27 are connected to corresponding inputs of a 12-bit up/down counter 43. The outputs of the counters 41 and 43 are connected to corresponding inputs of a conventional microprocessor 45.

The microprocessor illustrated here is an Intel Model No. 8080. The microprocessor is programmed to read the net command pulse counts from the counter 41, the net feedback pulse counts from counter 43 and resets both of the counters to zero once for each cycle of operation. The distance value of each command pulse and each interferometer pulse may vary depending upon the type of numerical controller and interferometer used. Typically, the value of a command pulse is 8 nanometers ($\frac{1}{3}$ $\mu$in.) while the resolution of the interferometer feedback pulse is approximately 5 nanometers (0.2076 $\mu$in.), the exact interferometer pulse value depends on ambient temperature, pressure and humidity. This resolution may be obtained from a helium-neon laser interferometer with a conventional 30X resolution extender connected in the output of the interferometer. The interferometer has an accuracy of ±0.5 part per million at a maximum velocity of 24 inches per minute in the 30X mode. A panel of thumbwheel switches 47 are provided so that an operator may select a 12-bit laser wavelength compensation value for correction of errors due to the prevailing temperature, pressure and humidity. Knowing the prevailing condition, the compensation value is read from an appropriate chart and dialed in on the panel by the operator.

In order to generate the slide drive signal, the microprocessor then corrects the laser pulse count and converts both the command pulse and compensated laser interferometer pulse count from the last cycle to a common base. The microprocessor then forms a 32-bit following error word. This step is accomplished by converting the command counts and the laser interferometer counts accumulated during the previous cycle into 32-bit words that have least-significant bit values of 25.4 femtometers (1 picoinch). The two words are then subtracted (the feedback word from the command word) and the upper 16 bits of the result are output to a digital-to-analog converter 49. The remaining 16 bits are stored and added to the following error word calculated in the next cycle.

The control software performs the following error calculation on a continuous basis, and the overall program cycle time is dependent on the number of counts being processed in any given cycle. However, the basic cycle time required to update the following error word is approximately 1.5 milliseconds; and, as a result, only a few feedback and command counts need to be processed in each cycle at feed rates below 0.1 ipm. In addition, the counters 41 and 43 have sufficient capacity to accommodate sudden disturbances to the system so that counts would not be lost.

The servo system is constructed around a 100 watt transistorized power amplifier 51 which has an output connected to the motor 13 control coil and an input connected to the output of a servo amplifier 53. The analog error signal ($E_f$) output from the D/A converter 49 is connected to the summing input of the servo amplifier 53, where it is summed with a negative filtered velocity feedback signal. The filtered velocity signal ($-E_a$) simulates negative acceleration feedback by the use of a series RC filter 55 in the servo feedback loop.

Since there are no rotating parts in the drive arrangement, a conventional voltage tachometer cannot be used to develop a velocity feedback signal as is normally used. To obtain a negative velocity feedback signal ($E_v$), the up/down outputs of the interferometer are connected to the inputs of a pair of frequency-to-voltage converters 57 and 59, respectively, to generate opposite polarity analog signals. The outputs of converters 57 and 59 are connected to separate inputs of a summing amplifier 61 to generate the analog velocity signal $E_v$. The series capacitor of the filter circuit further differentiates the velocity signal to simulate an approximate acceleration signal ($E_a$). This signal only approximates an acceleration signal because the capacitor does not provide true differentiation over the range of all possible input frequencies. Therefore, the feedback system is referred to as a filtered velocity feedback system rather than a true acceleration feedback system.

Figure 3:
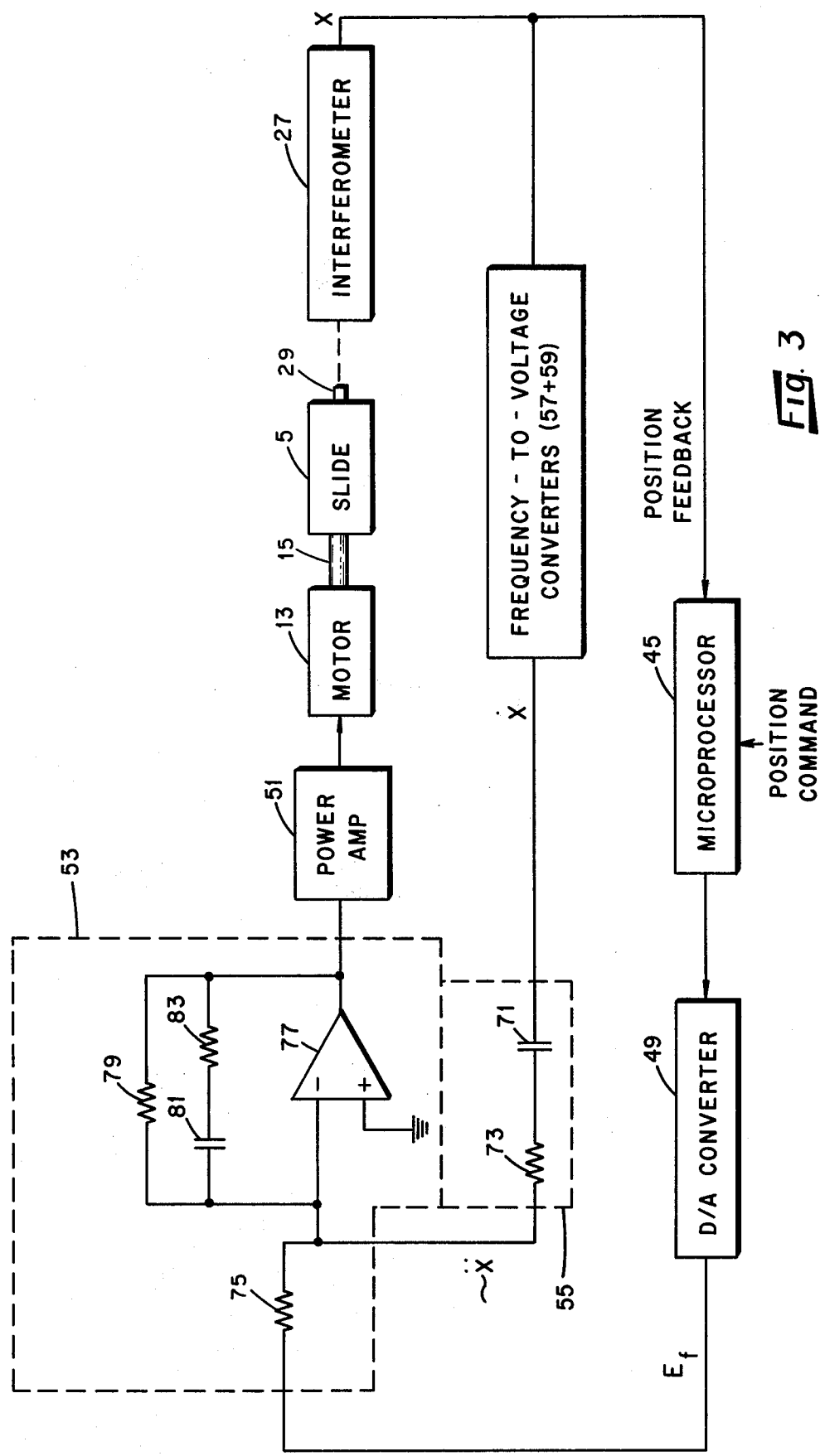
FIG. 3 is a schematic diagram of the control system with additional circuit details of the filter and servo amplifier shown in block form in FIG. 2.

Referring now to FIG. 3, wherein the servo amplifier 53 and the filter circuit 55 are shown in detail, the servo system circuitry and operation will be more fully described. The amplifier 53 and filter 55 are shown outlined by dashed lines and the remaining part of the system is shown in a simplified block diagram arrangement with reference numerals corresponding to identical parts shown in FIG. 2. The filter includes a series capacitor 71 and a resistor 73. The resistor 73 also serves as part of the summing resistor input to the amplifier 53. The other summing input resistor 75 is connected in series with the input of amplifier 53 connected to the output of the D/A converter 49, the following error signal ($E_f$) input. The resistors 73 and 75 are commonly connected to the inverting input of an operational amplifier 77 whose non-inverting input is connected to ground. A gain control feedback resistor 79 is connected between the inverting input and the output of amplifier 77. Further, a series RC lag compensation circuit is provided by means of capacitor 81 and resistor 83 connected in series between the inverting input and output of amplifier 77. The lag compensation network operates to provide an improved system stability and step response characteristic by decreasing the system gain as the input signal frequency is increased.

The system utilizes lag compensation and negative filtered velocity feedback to provide an extremely stable system along with a high-position loop gain. With the conventional pure velocity feedback of prior art systems, the necessary high loop gain to reduce the following error for accurate continuous path position control causes this system to be unstable. This problem was aggravated by the large slide mass and very low system friction. It was found that by using the filtered velocity feedback along with the lag compensation, as explained above, position loop gains of the order of 100 ipm/mil of following error are attainable. With this control system, the static positioning uncertainty is 16 nanometers (0.6 μin.), at standstill. At feedrates between 0.01 and 1.0 ipm, the position uncertainty is approximately 25.4 nanometers (1 μin.).

In operation, assuming that the microprocessor program has cleared the system and the U/D counters 41 and 43 are reset to zero, command pulses from the numerical controller 33 are applied to the counter 41. Assuming the slide 5 is traveling toward the interferometer in the foward direction, the command pulses on the up line to counter 41 cause the counter to count in the up direction the number of increments the slide is to move in the forward direction. Since the slide does not move instantaneously, the counter 43 will remain at the zero count and the following error signal $E_f$ will be positive, indicating that the slide is to move in the forward direction. As the slide begins to move at a velocity corresponding to the rate of command pulses, its movement is sensed by the interferometer which immediately begins to output pulses on the up line, the rate of pulses from the interferometer being indicative of the slide velocity. These pulses are counted by the counter 43 and for each microprocessor up date cycle, as explained above, the feedback counts are compared with the command pulse counts to calculate the following error value $(E_f)$ along with its sign (the most significant bit indicating the polarity). This value is converted by the D/A converter 49 to the corresponding analog value $E_f$ whose magnitude is proportional to the difference in the contents of the counters 41 and 43 per microprocessor cycle and the polarity indicates the direction of movement.

To control the continuous position and the velocity of the slide 5, the interferometer pulses are converted to a velocity signal $E_v$ by means of F/V converters 57 and 59 and the summing amplifiers 61. The polarity of the signal $E_v$ is determined by the F/V's 57 and 59. Assuming still that the slide is being commanded to move in the forward direction, the output pulses of the interferometer will appear on the up output line. This line is connected to the frequency to voltage converter 57 whose analog output signal is negative and thus the output of amplifier 61 $(E_v)$ is negative. This signal is filtered by the filter 55 to obtain a negative filtered velocity feedback signal $(E_a)$. Therefore, as the slide begins to move toward the commanded position, the signal $E_a$ reduces the amplifier 53 output when subtracted from the following error signal $E_f$. The microprocessor continues to compare the difference in counts registered by the command counter 41 and the feedback counter 43. The counter 43 is connected so that pulses on the up count line from interferometer 27 are counted in the up direction and pulses on the down count line, indicative of increments of movement in the reverse direction, count the counter down. The microprocessor continuously updates the following error signal $E_f$ whether or not counts are present in either of the counters 41 or 43.

When the commanded direction is reversed the system generates a negative following error signal $(E_f)$ and a positive filtered velocity feedback signal $E_a$. This is accomplished by the frequency-to-voltage converter 59 connected to the down output line of the interferometer. The output of converter 59 is a positive signal proportional to the pulse rate applied to its input and as long as the predominant movement of the slide is in the reverse direction the positive signal amplitude from converter 59 will be greater than the negative signal amplitude from converter 57. This signal is summed with the following error signal $E_f$ in the servo amplifier to control the slide velocity.

Thus it will be seen that a very precise and stable continuous-path closed-loop position-control system has been provided such that the position of an object, such as an air-bearing machine slide, may be continuously precisely controlled along an axis by means of a linear drive motor. It will be obvious to those skilled in the art that various modifications and changes may be made in the present invention from the above illustration and description of the invention without departing from the spirit and scope of the invention as set forth in the appended claims.

What is claimed is:

1. A linear motor drive system for continuous path, closed-loop position control of an object, comprising:

a base member;

a linear drive motor mounted on said base member and having an input for receiving a motion control signal whose amplitude controls the motor moving member force and the polarity controls the direction of applied force;

an object to be positioned along the axial path of movement of said motor coupled to said moving member of said motor;

an air-bearing slideway for supporting said object on said base member and allowing free movement of said object along said axial path;

means for generating position command pulses indicative of the distance and velocity said object is to be moved along said axial path;

an interferometer feedback system operatively coupled to said object for sensing the movement of said object and generating feedback pulse indicative of the distance and velocity of movement of said object;

computing means for comparing said position command pulses and said interferometer feedback pulses and calculating an analog following error signal indicative of the deviation of said object from the commanded position along said path; and a servo control means for generating and applying said motion control signal to said motor including a frequency-to-voltage converter means responsive to the output of said interferometer for generating an analog signal having an amplitude proportional to the velocity of movement of said object and a series RC network connected in series with the output of said frequency-to-voltage converter means for generating a filtered velocity signal having an amplitude proportional to the approximate acceleration of said object and means for comparing said filtered velocity signal with said following error signal and generating said motion control signal in response to the deviation of said object from the commanded continuous path position, so that said object is accurately positioned along the commanded axial path of movement of said object.

2. The linear motor drive system as set forth in claim 1 wherein said interferometer feedback system includes first and second output lines wherein pulses from said first output are indicative of the distance and rate of movement of said object in a "forward" direction and pulses from said second output are indicative of the distance and rate of movement of said object in the "reverse" direction, and wherein said frequency-to-voltage converter means includes a first frequency to voltage converter connected to said first output of said interferometer for generating a negative polarity velocity signal whose amplitude is proportional to the rate of movement of said object in said "forward" direction, a second frequency-to-voltage converter connected to the second output of said interferometer for generating a positive polarity velocity signal whose amplitude is proportional to the rate of movement of said object in the "reverse" direction and a summing amplifier having first and second inputs connected, respectively, to the outputs of said first and second frequency-to-voltage converters and an output connected to said series RC network, thereby generating said negative feedback filtered velocity signal at the output of said series RC network.

3. The linear motor drive system as set forth in claim 2 further including a power amplifier connected in series with the output of said servo amplifier means and whose output is connected to the input of said motor.

4. The linear motor drive system as set forth in claim 3 wherein said command pulse generating means includes a numerical controller having an up pulse output line on which pulses are generated, each indicative of an increment of movement of said object in the "forward" direction, and a down pulse output line on which pulses are generated, each indicative of a corresponding increment of movement of said object in the "reverse" direction, and wherein said computing means includes a first up/down counter having up and down pulse count inputs connected, respectively, to said up and down pulse output lines of said controller, a second up/down counter having up and down pulse count inputs connected, respectively, to said first and second outputs of said interferometer, a microprocessor operatively connected to said first and second up/down counters and programmed to calculate a digital following error signal indicative of the difference in counts registered by said first and second up/down counters during each update cycle and a digital-to-analog converter connected between the output of said microprocessor and said input of said servo amplifier for converting said digital following error signal to said analog following error signal.

5. The linear motor drive system as set forth in claim 4 wherein said servo amplifier means includes an operational amplifier having an inverting input and non-inverting input and an output, said output of said operational amplifier connected to the input of said power amplifier, said non-inverting input connected to ground potential, said inverting input connected to the output of said series RC network, a resistor connected in service between the output of said digital-to-analog converter and said inverting input of said operational amplifier, a gain control feedback resistor connected between the output and said inverting input of said operational amplifier, and a lag compensation network including a series connected resistor and a capacitor connected between the output and the inverting input of said operational amplifier.

* * * * *